United States Patent [19]

La Pierre et al.

[11] 4,257,872

[45] Mar. 24, 1981

[54] LOW PRESSURE HYDROCRACKING OF REFRACTORY FEED

[75] Inventors: Rene B. La Pierre, Morrisville, Pa.; David S. Shihabi, Pennington; Robert L. Smith, Hopewell, both of N.J.

[73] Assignee: Mobil Oil Corporation, Fairfax, Va.

[21] Appl. No.: 86,875

[22] Filed: Oct. 22, 1979

[51] Int. Cl.³ .................... C10G 47/16; C10G 65/10
[52] U.S. Cl. ...................................... 208/59; 208/111
[58] Field of Search ................................ 208/59, 111

[56] References Cited

U.S. PATENT DOCUMENTS

| | | | |
|---|---|---|---|
| 3,256,177 | 6/1966 | Tulleners et al. | 208/59 |
| 3,287,252 | 11/1966 | Young | 208/59 |
| 3,726,787 | 4/1973 | Frazier et al. | 208/59 |
| 3,790,471 | 2/1974 | Argauer et al. | 208/111 |

*Primary Examiner*—Herbert Levine
*Attorney, Agent, or Firm*—Charles A. Huggett; Charles J. Speciale

[57] ABSTRACT

The present invention provides a process for low pressure catalytic hydrocracking of refractory hydrocarbon charge stocks, such as coker gas oil or shale oil to products of reduced pour points by catalytic hydrotreating and cascading the hydrotreater effluent through a hydrocracking zone, containing a catalyst which is characterized by an alkali metal substantilly non-acidic crystalline zeolite having an alpha activity of less than about 10, a silica/alumina ratio of at least about 12 and a constraint index of approximately 1 to 12.

12 Claims, No Drawings

LOW PRESSURE HYDROCRACKING OF REFRACTORY FEED

BACKGROUND OF THE INVENTION

Field of the Invention

This invention relates to low pressure catalytic hydrocracking of refractory hydrocarbon charge stocks, such as, for example, a catalytic cracking cycle stock, a coker gas oil or shale oil, in a dual bed hydrotreating-/hydrocracking cascade system.

Present refinery practice in upgrading coker gas oil generally involves hydroprocessing to remove heteroatoms, followed by fluid catalytic cracking or high pressure hydrocracking in a two step operation. Such processes have entailed high equipment costs. Thus, fluid catalytic cracking of even hydroprocessed material requires high severity operation causing excessive coke formation, leading to reduced catalyst life. The necessity to use high pressure has placed an additional economic burden on the overall process.

SUMMARY OF THE INVENTION

In accordance with the present invention, there has been discovered a dual bed hydrotreating/hydrocracking cascade process for effectively upgrading refractory hydrocarbon stocks characterized by a Bromine No. greater than about 10 and an aromatics content of at least about 40 weight percent, such as coker gas oil, catalytic cracking cycle stock and shale oil, which process can be carried out at substantially lower pressures than those heretofore employed in the aforenoted two stage high pressure process.

The present process has been found to provide desired selective conversion of the above characterized refractory hydrocarbon feeds. With coker gas oils, for example, specific improvements include decreased $C_1$-$C_4$ selectivities. Utilizing shale oil as feed, the process described herein is highly effective in achieving pour point lowering of shale oil products.

The refractory hydrocarbon feed, contemplated for upgrading in accordance with the present process contains at least about 40 and generally between about 40 and about 70 weight percent aromatics and has a Bromine No. in excess of about 10 and usually in the approximate range of 10 to 60. Representative of such feeds are low hydrogen refractory materials, such as catalytic cracking cycle stocks, shale oils, coker gas oils, and coal derived liquids which are mostly polyaromatic in structure and may contain appreciable amounts of sulfur, oxygen and nitrogen capable of being effectively removed in accordance with the present process.

The dual catalyst bed cascade process of this invention is conducted at a pressure within the approximate range of 100 to 3000 psig and preferably between about 500 and about 2000 psig. The temperature is generally within the approximate range of 550° F. to 950° F., with an increasing temperature gradient, as the feed passes initially through the bed of hydrotreating catalyst and thereafter through the bed of hydrocracking catalyst. Suitably, the temperature in the hydrotreating catalyst bed will be within the approximate range of 550° F. to 850° F. and in the hydrocracking catalyst bed within the approximate range of 650° F. to 950° F. The feed is conducted through the catalyst beds at an overall space velocity between about 0.1 and about 5 and preferably between about 0.2 and about 2, along with hydrogen initially present in the hydrotreating zone in an amount between about 1000 and about 10,000 standard cubic feet per barrel of feed, corresponding to a ratio of between about 2.4 and about 24 moles of hydrogen per mole of hydrocarbon and thereafter present in the hydrocracking zone in an amount between about 2 and about 23 moles of hydrogen per mole of charge to said hydrocracking zone.

The hydrotreating catalysts employed are generally metals or metal oxides of Group VIB and/or Group VIII deposited on a solid porous support such as silica and/or metal oxides such as alumina, titania, zirconia or mixtures thereof. Representative Group VIB metals include molybdenum, chromium and tungsten and Group VIII metals include nickel, cobalt, palladium and platinum. These metal components are deposited, in the form of metals or metal oxides, on the indicated supports in amounts generally between about 0.1 and about 20 weight percent.

Initial hydrotreating of the refractory hydrocarbon feed serves to convert sulfur, nitrogen and oxygen derivatives of hydrocarbon to hydrogen sulfide, ammonia, and water while depositing metal contaminant from hydrodecomposition of any organo-metal compounds. The entire effluent from the hydrotreating zone containing hydrogen, hydrocarbons, hydrogen sulfide, ammonia, and water is passed to a hydrocracking zone over catalyst containing a crystalline aluminosilicate zeolite, characterized by a silica/alumina ratio greater than 12 and a constraint index, as hereinafter defined, in the approximate range of 1 to 12, such as, for example, zeolite ZSM-5, wherein said zeolite is in an alkali metal non-acidic form having an alpha value, hereinafter defined, of less than about 10 and preferably less than about 5. A more active and selective version of such low-acidity catalyst may be prepared by contacting the zeolite with steam at elevated temperature prior to preparing the alkali metal non-acidic form.

Thus, the process of this invention provides a dual bed system for upgrading a nitrogen, oxygen, and sulfur-containing hydrocarbon charge by contacting a stream of such charge initially in a hydrotreating zone containing a hydrotreating catalyst under the aforenoted conditions and thereafter passing the entire effluent from the hydrotreating zone to a hydrocracking zone containing a particularly defined alkali metal non-acidic crystalline aluminosilicate zeolite-containing hydrocracking catalyst under the above specified conditions of reaction. The latter zeolite-containing catalyst would appear to have the unique ability to bring pressure requirements for the hydrocracking zone to within the range of pressure employed in the hydrotreating zone, i.e., permit use of lower pressures in the hydrocracking zone over those previously employed. Moreover, the ability of the present process to convert the above stocks, such as shale oil to low pour shale oil products is a significant feature differentiating the present operation from previous high pressure hydrocracking systems.

DESCRIPTION OF SPECIFIC EMBODIMENTS

The catalyst employed in the hydrocracking zone of the hereinabove described process comprises a crystalline aluminosilicate zeolite which is a member of a novel class of zeolites exhibiting some unusual properties. These zeolites induce profound transformation of aliphatic hydrocarbons to aromatic hydrocarbons in commercially desirable yields and are generally highly effective in conversion reactions involving aromatic hydrocarbons. Although they have unusually low alumina contents, i.e., high silica to alumina ratios, they are very active even when the silica to alumina ratio exceeds 30. The activity is surprising since catalytic activity is generally attributed to framework aluminum atoms and cations associated with these aluminum atoms. These zeolites retain their crystallinity for long periods in spite of the presence of steam at high temperature which induces irreversible collapse of the framework of other zeolites, e.g., of the X and A type.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e., they exhibit 'hydrophobic' properties.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the 'constraint index' may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The 'constraint index' is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are:

| CAS | C.I. |
|---|---|
| ZSM-5 | 8.3 |
| ZSM-11 | 8.7 |
| ZSM-12 | 2 |
| ZSM-38 | 2 |
| ZSM-35 | 4.5 |
| Clinoptilolite | 3.4 |
| TMA Offretite | 3.7 |
| Beta | 0.6 |
| ZSM-4 | 0.5 |
| H-Zeolon | 0.4 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination; with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina ratio. In those instances, a temperature of up to about 1000° F. and a liquid hourly space velocity of less than one, such as 0.1 or less, can be employed in order to achieve a minimum total conversion of about 10%.

The class of zeolites defined herein is exemplified by ZSM-5, ZSM-11, ZSM-12, ZSM-35 and ZSM-38 and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which is incorporated herein by reference.

ZSM-35 is more particularly described in U.S. Pat. No. 4,016,245, the entire contents of which is incorporated herein by reference.

ZSM-38 is more particularly described in U.S. Pat. No. 4,046,859, the entire contents of which is incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cation in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12, ZSM-38 and ZSM-35 with ZSM-5 particularly preferred.

In a preferred aspect of this invention, the zeolites hereof are selected as those having a crystal framework density, in the dry hydrogen form, of not substantially below about 1.6 grams per cubic centimeter. It has been found that zeolites which satisfy all three of these criteria are most desired. Therefore, the preferred zeolites of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in 'Proceedings of the Conference on Molecular Sieves, London, April 1967,' published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

| Zeolite | Void Volume | Framework Density |
| --- | --- | --- |
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The crystal size of the synthesized zeolite is generally within the approximate range of 0.01 to 40 microns. Preferably, the crystal size of the described crystalline aluminosilicate zeolite employed in the process of the invention is less than about 0.05 micron.

The zeolite synthesized directly in the alkali metal form, generally the sodium form, is non-acidic or of very low acidity. The alkali metal content is above about 90% of the ion exchange capacity. Such zeolite is further characterized by an activity, as measured by an alpha activity of less than about 10, preferably less than about 5. Alpha activity is a measure of normal hexane cracking conversion relative to a silica-alumina cracking catalyst and the alpha test is described in a Letter to the Editor entitled 'Superactive Crystalline Aluminosilicate Hydrocarbon Cracking Caralyst' by P. B. Weisz and J. N. Miale, Journal of Catalysis, Volume 4, August 1965, pages 527–529, which publication is incorporated herein by reference.

In practicing the process described herein, it may be desirable to incorporate the above-described crystalline aluminosilicate zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays, which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in a raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and magnesia-zirconia. The matrix may be in the form of a cogel. The relative proportions of zeolite component and inorganic oxide gel matrix may vary widely with the zeolite content ranging from between about 1 to about 99 percent by weight and more usually in the range of about 5 to about 80 percent by weight of the composite.

Conditions for effective hydrotreating are well known and need no detailed review except to note that cascading the hydrotreater effluent to the second stage requires that sufficient hydrogen be supplied with charge to the hydrotreater zone in order that requirements of both stages shall be satisfied. Pressure in the system described herein may differ or be the same for the hydrotreating and hydrocracking zones and is generally within the approximate range of 100 to 3000 psig and preferably between about 500 and about 2000 psig. Generally, it will be found desirable to employ higher temperature in the second than in the first stage to achieve high conversion to lower boiling products in the second stage. This is accomplished by inter-stage heating. Space velocities for the two stages are adjusted by sizes of the catalyst beds.

The following examples will serve to illustrate the process of the invention without limiting the same:

EXAMPLE 1

A tar sand derived heavy coker gas oil was processed, along with hydrogen, in a system made up of an initial bed of hydrotreating catalyst and a second bed of hydrocracking catalyst.

The charge stock had the following properties:

| Analysis, Elemental, % | |
|---|---|
| Carbon | 85.26 |
| Hydrogen | 10.75 |
| Nitrogen, | .16 |
| Sulfur | 3.55 |
| Oxygen | .28 |
| Bromine No. | 20.3 |
| Carbon Residue, Conradson, % | .21 |

| Distillation, °F. | % | T° F. |
|---|---|---|
|  | 5 | 500 |
|  | 50 | 686 |
|  | 95 | 905 |
| Pour Point, °F. |  | 20 |
| Paraffins | 6.3 | |
| Mononaphthenes | 9.5 | |
| Polynaphthenes | 22.8 | |
| Aromatics | 61.5 | |

Operating conditions included a pressure of 1000 psig, a hydrotreating catalyst bed temperature of 723°–728° F., a hydrocracking bed temperature of 849°–901° F., hydrogen in the amount of 2500 standard cubic feet of hydrogen per barrel of charge and an overall space velocity of 0.3–0.5.

The hydrotreating catalyst was in the form of an extrudate having a surface area of 152 m$^2$/gram and containing, expressed as weight percent oxides, the following composition:
Nickel, 4.1%
Molybdenum, 19.0%
Aluminum, 76.9%

Effluent from the hydrotreating zone was passed directly without interstage separation to a hydrocracking zone containing catalyst. For purposes of comparison with the alkali metal non-acidic zeolite catalyst utilized in the process of the invention, i.e. Na ZSM-5, similar run was made with a hydrogenation metal acidic zeolite catalyst, i.e. Pd H ZSM-5.

The Na ZSM-5 hydrocracking catalyst contained 1.3 weight percent sodium, had a surface area of 400 m$^2$/gram and was characterized by an alpha activity of 0.07.

The Pd H ZSM-5 hydrocracking catalyst contained 0.36 weight percent palladium, had a surface area of 346 m$^2$/gram and an alpha activity of approximately 150.

Both the Pd HZSM-5 and Na ZSM-5 were made from NH$_4$ZSM-5, wt slurried with 35 weight percent Al$_2$O$_3$, followed by extrusion in the form of 1/16′ particles.

The Na ZSM-5 was made by base exchange of the NH$_4$ZSM-5 extrudate. The exchange was carried out at 10 pH using 0.5 N aqueous NaCl, adding 0.1 N NaOH as required to maintain the pH level. The Pd ZSM-5 was made by impregnating NH$_4$ZSM-5 extrudate with palladium tetraamine chloride. The impregnated product was dried and calcined at 1000° F.

Product distribution and total liquid product pour points obtained in each instance are set forth in Table 1 below:

TABLE 1

| Catalysts | Feed | NiMo/Al$_2$O$_3$, | PdHZSM-5 | NiMo/Al$_2$O$_3$, | NaZSM-5 |
|---|---|---|---|---|---|
| NiMo/Al$_2$O$_3$ T(°F.) |  | 723 | 777 | 728 | 773 |
| ZSM-5 T(°F.) |  | 849 | 899 | 850 | 901 |
| Overall LHSV |  | 0.5 | 0.3 | 0.5 | 0.3 |
| C$_1$–C$_4$ | — | 12.0 | 28.3 | 7.6 | 13.5 |
| C$_5$–420 | 0.9 | 14.7 | 25.6 | 14.6 | 31.6 |
| 420–650 | 38.0 | 45.0 | 33.4 | 45.8 | 38.5 |
| 650–800 | 44.4 | 24.5 | 11.9 | 26.6 | 14.2 |
| 800+ | 16.7 | 3.9 | 0.7 | 5.4 | 2.3 |
| Pour Point (°F.) | +20 | <−65 | <−65 | <−65 | −45 |

It will be seen from the above results that while both ZSM-5 catalysts served to reduce pour point, C$_1$–C$_4$ production was reduced in half by using the NaZSM-5 catalyst.

EXAMPLE 2

A Paraho shale oil was processed, along with hydrogen, in a system comprising an initial bed of hydrotreating catalyst and a second bed of hydrocracking catalyst.

The charge stock had the following properties:

| Analysis, Elemental, % | |
|---|---|
| Carbon | 84.89 |
| Hydrogen | 11.24 |
| Nitrogen | 1.86 |
| Sulfur | .71 |
| Oxygen | 1.3 |
| Bromine No. | 43.9 |
| Carbon Residue, Conradson, % | 2.78 |

-continued

| Distillation, °F. | |
|---|---|
| % | |
| 5 | 390 |
| 25 | 585 |
| 50 | 760 |
| 75 | 900 |
| 95 | 1050 |
| Pour Point, °F. | 80 |

Operating conditions included a pressure of 1000–1500 psig, a hydrotreating catalyst bed temperature of 749°–755° F., a hydrocracking bed temperature of 852°–866° F., hydrogen in the amount of 2500 standard cubic feet of hydrogen per barrel of charge and an overall space velocity of 0.25–0.27.

For purposes of comparison with the alkali metal non-acidic zeolite catalysts utilized in the process of the invention, i.e., NaZSM-5 and improved Na ZSM-5, another run was made with a hydrogenation metal acidic zeolite catalyst, i.e., Ni H ZSM-5.

The NaZSM-5 hydrocracking catalyst contained 1.3 weight percent sodium, had a surface area of 400 m$^2$/gram and was characterized by an alpha activity of area of 129 m$^2$/gram and containing, expressed as weight percent oxides the following metals:
Cobalt, 1.75%
Molybdenum, 10%
Nickel, 1.75%
Titanium, 30.7%
Zirconium, 30.7%
Aluminum, 25%

The volume ratio of such hydrotreating catalyst to hydrocracking catalyst employed was 3:1.

The hydrotreating catalyst employed with the NaZSM-5 hydrocracking catalyst was Ni W Al$_2$O$_3$ in the form of an extrudate having a surface area of 216 m$^2$/gram and having the following composition:
Nickel, 6.5
Tungsten, 19.7
Silica, 23.0
Alumina, 33.6
Titania, 9.5

The volume ratio of such hydrotreating catalyst to hydrocracking catalyst employed was 2.1.

Product distribution and total liquid product pour points obtained in each instance are set forth in Table 2 below:

TABLE 2

| Catalysts | Feed | CoMoNi/TiO$_2$ . ZrO$_2$ Al$_2$O$_3$, NiHZSM-5 | NiW/SiO$_2$ . Al$_2$O$_3$, NaZSM-5 | NiW/SiO$_2$ . Al$_2$O$_3$ Improved Na ZSM-5 |
|---|---|---|---|---|
| Pressure | | 1000 | 1500 | 1500 |
| Hydrotreating T(°F.) | | 749 | 755 | 751 |
| ZSM-5 T(°F.) | | 866 | 852 | 824 |
| Overall LHSV | | 0.25 | 0.27 | 0.27 |
| C$_1$–C$_4$ | — | 7.4 | 12.2 | 11.7 |
| C$_5$–420 | 7.9 | 24.4 | 26.2 | 28.9 |
| 420–690 | 30.8 | 47.7 | 41.4 | 42.4 |
| 690–805 | 18.9 | 14.4 | 13.8 | 12.0 |
| 805+ | 42.4 | 6.2 | 6.4 | 5.0 |
| Pour Point (°F.) | +80 | +50 | +5 | −10 |

0.07. The catalyst was made by base exchange of NH$_4$ZSM-5 which had been slurried with 35 weight percent Al$_2$O$_3$ and extruded (1/16') prior to exchange. The exchange was carried out at 10 pH using 0.5 N aqueous NaCl adding 0.1 N NaOH as required to maintain the pH level.

The improved Na ZSM-5 catalyst was prepared from NH$_4$ ZSM-5 which has been slurried with 35 weight percent Al$_2$O$_3$ and extrudated (1/16'). This material was converted to the hydrogen form by calcining in air at 1000° F. for 4 hours. 14 grams of the H ZSM-5 so prepared was contacted with 100% steam at 800° F. for 47.5 hours. The steam treated product was found to have an alpha value of 33. The steam treated product was added to 200 ml of 1N NH$_4$NO$_3$ solution having a pH of 4.6. The mixture was maintained at 100° C. for one hour with continuous stirring. The ammonium nitrate solution was decanted and the resulting catalyst was worked with demineralized water. The final product was exchanged with sodium to an alpha value of 4.4.

The Ni H ZSM-5 hydrocracking catalyst contained 0.9 weight percent nickel, had a surface area of about 300 m$^2$/gram and an alpha activity of approximately 110. The catalyst was prepared by ion-exchanging H ZSM-5 with aqueous Ni(NO$_3$)$_2$, after which the impregnated product was dried and calcined at 1000° F.

It was then wet slurried with 35 weight percent Al$_2$O$_3$, extruded in the form of 1/16' particles, dried and calcined in air at 1000° F.

The hydrotreating catalyst employed with the Ni H ZSM-5 hydrocracking catalyst was Co Mo Ni/TiO$_2$.-ZrO$_2$.Al$_2$O$_3$ in the form of an extrudate having a surface It will be evident from the above results that NaZSM-5 catalysts afforded a very substantial reduction in pour point of the shale oil product, with the improved Na ZSM-5 catalyst showing a higher activity at lower temperature.

What is claimed is:

1. A dual bed process for upgrading a refractory hydrocarbon feed, characterized by a Bromine No. greater than about 10 and an aromatics content of at least about 40 weight percent, which comprises contacting a stream of said feed initially in a hydrotreating zone containing a bed of hydrotreating catalyst under reaction conditions which include a pressure within the range of about 100 to about 3000 psig, a temperature between 550° F. and about 850° F. in the presence of between about 2.4 and about 24 moles of hydrogen/-mole of hydrocarbon charge; passing the entire effluent from said hydrotreating zone to a hydrocracking zone containing a bed of hydrocracking catalyst comprising an alkali metal non-acidic crystalline aluminosilicate zeolite characterized by an alpha activity of less than about 10, a silica to alumina ratio of at least about 12 and a constraint index within the approximate range of 1 to 12 under reaction conditions which include a pressure within the above stated range, a hydrogen concentration between about 2 and about 23 moles of hydrogen per mole of charge to said latter zone and a temperature between about 650° F. and about 950° F. and recovering a product of reduced pour point directly from the aforenoted dual bed sequential operation.

2. The process of claim 1 wherein said hydrocarbon feed contains between about 40 and about 70 weight percent of aromatics and has a Bromine No. in the approximate range of 10 to 60.

3. The process of claim 1 wherein said hydrocarbon feed is a catalytic cracking cycle stock.

4. The proces of claim 1 wherein said hydrocarbon feed is coker gas oil.

5. The process of claim 1 wherein said hydrocarbon feed is shale oil.

6. The process of claim 1 where feed is a coal derived liquid.

7. The process of claim 1 wherein said zeolite is selected from the group consisting of ZSM-5, ZSM-11, ZSM-12, ZSM-35 and ZSM-38.

8. The process of claim 1 wherein said zeolite is ZSM-5.

9. The process of claim 1 wherein said zeolite is NaZSM-5.

10. The process of claim 1 wherein said pressure is between about 500 and about 2000 psig.

11. The process of claim 1 wherein said alpha activity is less than about 5.

12. The process of claim 1 wherein said hydrotreating catalyst contains at least one metal or metal oxide of Group VIB or Group VIII deposited on a solid porous support.

* * * * *

UNITED STATES PATENT AND TRADEMARK OFFICE
CERTIFICATE OF CORRECTION

PATENT NO. : 4,257,872

DATED : March 24, 1981

INVENTOR(S) : Rene B. La Pierre, David S. Shihabi and Robert L. Smith

It is certified that error appears in the above-identified patent and that said Letters Patent are hereby corrected as shown below:

Abstract: Line 7, delete "substantilly" and insert -- substantially --.

Column 6, line 42, delete "Caralyst" and insert -- Catalyst --

Column 10, line 21, delete "2.1" and insert -- 2:1 --.

Signed and Sealed this

Twenty-second Day of September 1981

[SEAL]

Attest:

Attesting Officer

GERALD J. MOSSINGHOFF

Commissioner of Patents and Trademarks